April 19, 1927.
W. J. SHAW
BEARING
Filed Jan. 20, 1923
1,625,568
2 Sheets-Sheet 1
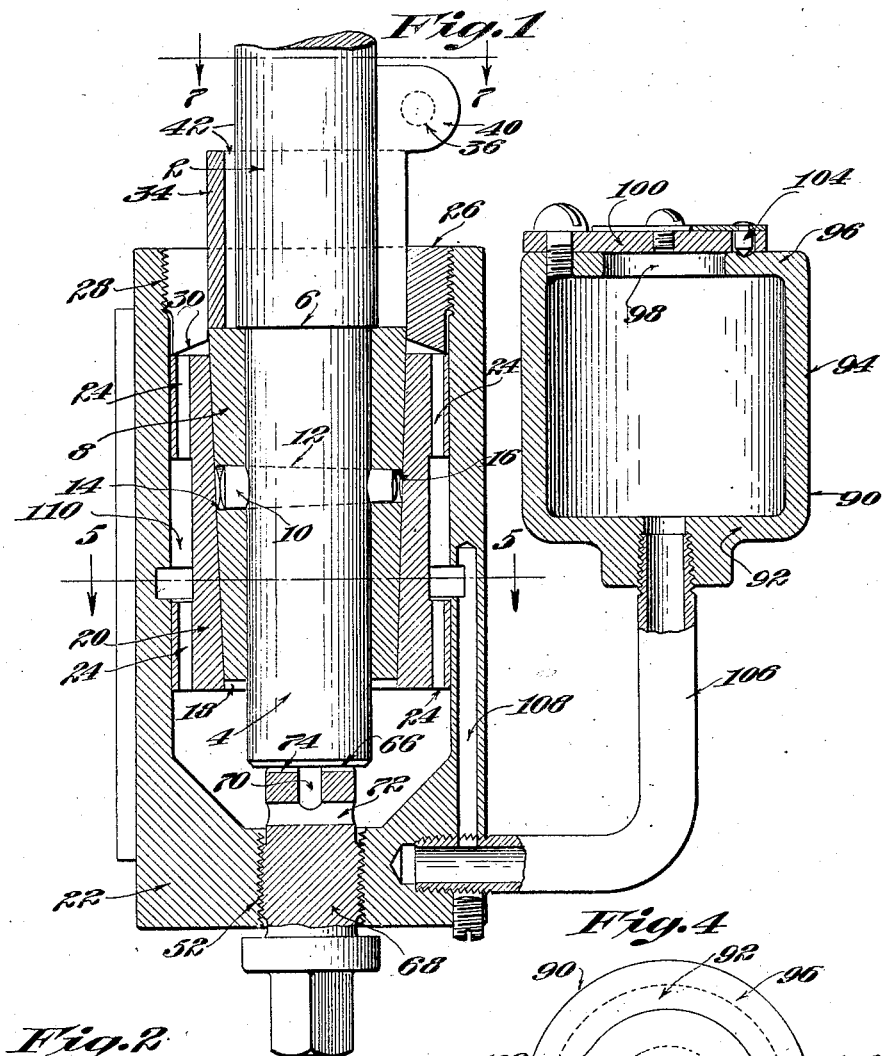
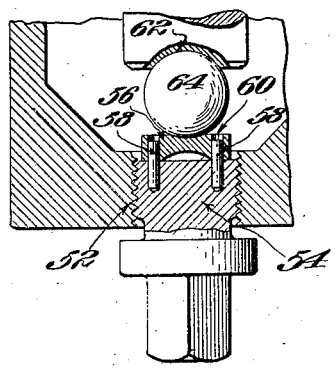
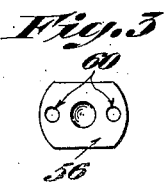
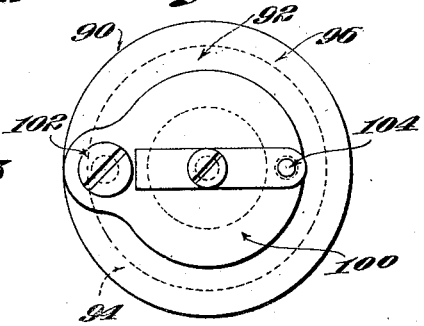
Inventor
Wesley J. Shaw
by David Rines
Attorney April 19, 1927.
W. J. SHAW
BEARING
Filed Jan. 20, 1923
1,625,568
2 Sheets-Sheet 2
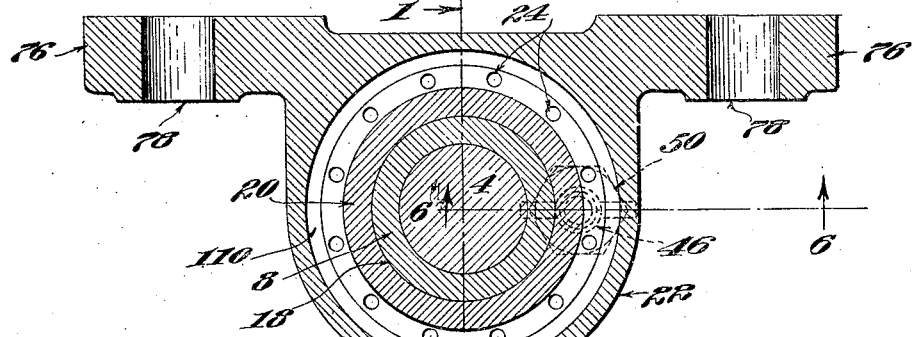
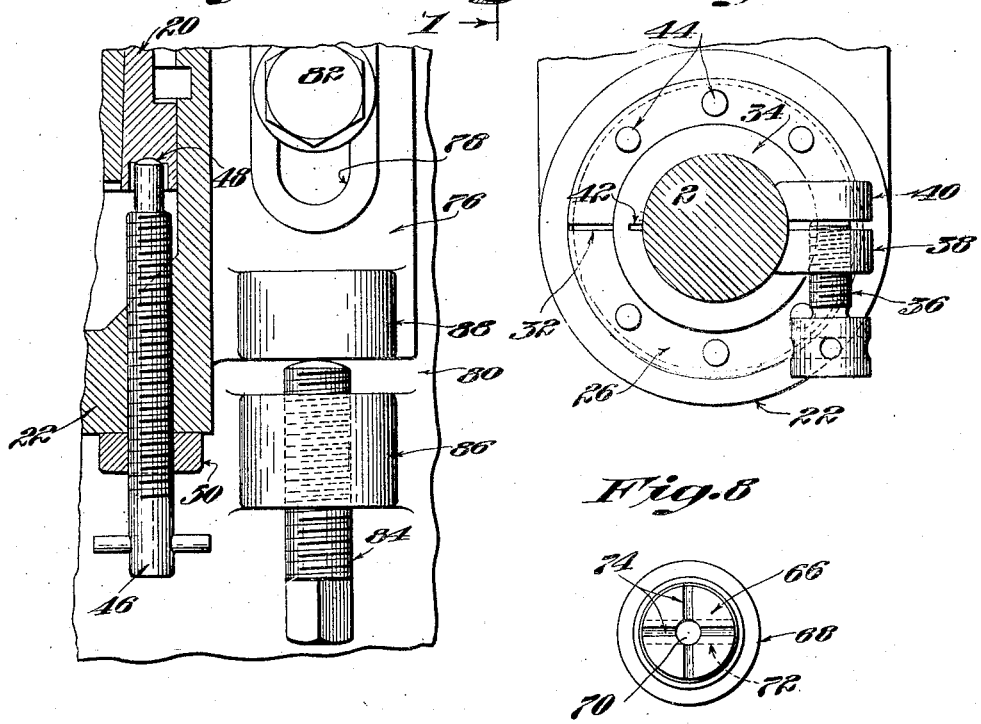
Inventor
Wesley J. Shaw
by David Rines
Attorney Patented Apr. 19, 1927.

1,625,568

UNITED STATES PATENT OFFICE.

WESLEY J. SHAW, OF HAVERHILL, MASSACHUSETTS, ASSIGNOR TO NEW ENGLAND WOOD HEEL CO., OF HAVERHILL, MASSACHUSETTS, A CORPORATION OF MASSACHUSETTS.

BEARING.

Application filed January 20, 1923. Serial No. 613,857.

The present invention relates to shaft-and-bearing structures, and more particularly to structures comprising vertically disposed shafts.

The object of the invention is to improve upon present-day constructions of the above-described character, to the end that their efficiency and life may be increased, and their manufacture simplified and cheapened.

To the attainment of these ends, the invention consists of the improved shaft, bearing and appliances therefor preferred embodiments of which are hereinafter described, illustrated in the accompanying drawings, and defined in the appended claims.

In the accompanying drawings, Fig. 1 is a vertical section, partly in elevation, of a preferred embodiment of the present invention, the section being taken substantially upon the line 1—1 of Fig. 5, looking in the direction of the arrows; Fig. 2 is a fragmentary similar section of a modification; Fig. 3 is an elevation of a bearing plate shown in section in Fig. 2; Fig. 4 is a plan of a preferred oil cup shown in section in Fig. 1; Fig. 5 is a horizontal section taken upon the line 5—5 of Fig. 1, looking in the direction of the arrows; Fig. 6 is a fragmentary vertical section taken upon the line 6—6 of Fig. 5, looking in the direction of the arrows; Fig. 7 is a horizontal section taken upon the line 7—7 of Fig. 1, looking in the direction of the arrows; and Fig. 8 is a plan of the preferred bearing plug illustrated in Fig. 1.

A preferred embodiment of the invention is shown in Fig. 1 in connection with a vertically disposed shaft having a portion 2 of relatively enlarged diameter and a portion 4 of relatively reduced diameter that are separated from each other by an annular shoulder 6. A tapered bearing sleeve 8 is fixed to the portion 4 of the shaft, with its upper portion in contact with the shoulder 6 of enlarged diameter, as shown in Fig. 1. The bearing sleeve 8 thus constitutes a tapered bearing portion for what is, in effect, a tapered shaft. It is preferred to maintain the sleeve upon the shaft by means of a tapered pin 10 within a transversely disposed tapered opening 12 in the portion 4 of the shaft and oppositely disposed openings 14 and 16 of the bearing sleeve 8 that aline with the tapered opening 12.

The tapered sleeve 8 bears against the walls of a tapered bore 18 of a bushing 20 that is mounted in a vertically disposed tubular member, shown as a cup 22. The bushing is provided with a plurality of vertically disposed oil ports 24. During the rotation of the shaft, therefore, oil or other lubricant that is contained within the cup 22 will be caused to travel upward, by centrifugal force, between the tapered sleeve 8 and the walls of the bore 18, then over the top of the bushing 20, and finally downward, through the oil ports, back to the bottom of the cup 22. This circulation of the oil is continued so long as the shaft rotates, which assures the presence of a film of oil between the bearing sleeve 8 and the walls of the bore 18 during the rotation of the shaft.

An annular nut 26 is threaded into internally provided threads 28 at the top of the cup 22 to keep dirt and other impurities from the bearing parts and the oil. The nut is threaded into contact with the top of the bushing 20 to maintain the latter in position. In order not to close the oil ports 24, which would interfere with the circulation of the oil over the top of the bushing 20 and into the oil ports 24, the bottom wall of the nut 26 is cut away, or beveled, as shown at 30. The nut 26 is made expansible to cause it to engage closely the interior walls of the cup 22, and thus to prevent accidental loosening of the nut. In the particular embodiment of the invention that is herein illustrated and described, the expansive property is imparted to the nut by slitting it at 32. A split collar 34, through which the portion 2 of the shaft extends into the cup 20, is mounted within the annular nut, and is shown resting against the tapered sleeve 8. A set screw 36 is threaded into an ear 38 of the collar 34 and engages an oppositely disposed ear 40. By screwing and unscrewing the set screw 36, the collar 34 may be expanded and contracted to engage the annular nut 26 more or less tightly, as desired, and thus to vary the degree of expansion of the nut 26. This, in turn, will determine whether the nut 26 will engage the interior walls of the cup 20 more or less tightly. To render the split collar readily expansible, it is further slit at 42, preferably at a point midway between the ears 38 and 40. The nut 26 may obviously be rotated by rotating the collar 34, all that is necessary for this purpose being to expand the collar 34 to a degree sufficient to bind against the nut 26, but with a binding action not too great to cause the nut 26 to bind against the cup 22. The nut 26 may, however, be rotated independently of the collar 34 by means of pins 44 that may be engaged by a spanner wrench.

The bearing sleeve is preferably of steel, and the bushing 20 of bronze. The wear will therefore take place in the bronze bushing 20, and may be compensated for, from time to time, by vertically adjusting the bushing 20 in the cup 22, without affecting the position of the shaft. The adjustment may be effected by means of a screw 46 that is threaded into the bottom or end wall of the cup 22, as shown in Fig. 6, and the upper end of which engages the bushing 20 at 48. The nut 26 must first be unscrewed, after which the screw 46 is actuated to raise the bushing. A lock nut 50 is then tightened to hold the screw 46 in position, after which the nut 26 is returned into contact with the top of the bushing 8, and expanded into close engagement with the interior walls of the cup 20, as before described.

The above-described construction affords a very secure and evenly balanced mounting for the various parts, for the nut 26 engages all portions of the top of the bushing 20 with even pressure throughout. The parts are so proportioned, furthermore, as to prevent any leaking or other waste of oil.

The lower end of the shaft rests against the bottom wall of the cup, which acts as a thrust bearing therefor. In order to compensate for wear, without disturbing the position of the shaft, it becomes necessary to adjust the thrust-bearing portion of the bottom of the cup. Two different constructions are shown in Figs. 1 and 2. In both constructions, the thrust-bearing portion is provided upon a bearing plug that is threaded into a screw-threaded opening 52 that is provided in the bottom wall of the cup. This permits of wholly removing the plug from the cup 22 without necessitating taking the remainder of the structure apart. Such construction is particularly advantageous in connection with the plug 54, shown in Fig. 2 as provided with a reversible bearing plate 56; for when the bearing plate wears down, the plug 54 may be screwed out of its mounting in the bottom of the cup, the bearing plate 56 may be reversed, and the plug may then be returned in place. In the particular construction shown, the plug 54 is provided with two upward projecting pins 58, and the bearing plate 58 is provided with two openings 60 that are adapted to receive the pins, whereby the bearing plate is removably secured to the plug. In this modification, the end of the shaft is hollowed out at 62 to receive a ball 64 against which the end of the shaft engages and which is adapted to rest upon the bearing plate between the pins 58.

The preferred embodiment shown in Fig. 1 does not depend upon the use of a ball 64. The lower end of the shaft shown in this figure is not hollowed out, as in Fig. 2, but is perfectly plane, and it rests against the upper correspondingly plane surface 66 of a plug 68. Some means must be provided for maintaining a lubricating film between the lower end of the shaft and the thrust-bearing surface 66 of the plug 68 during the rotation of the shaft. The desired result is attained, according to the illustrative embodiment of the invention, by providing the plug 68 with a central longitudinally disposed opening 70 and with a transversely disposed opening 72 communicating therewith. The oil from the cup 22 is thus supplied to the longitudinally disposed opening 70 through the transversely disposed opening 72. The bearing surface 66 is provided with one or more grooves 74 into which the oil flows from the longitudinally disposed opening 70. As the shaft rotates, therefore, the oil in the grooves 74 will be caused to spread over the thrust-bearing surface 66 of the plug 68, maintaining a lubricating film between the end of the shaft and the thrust bearing.

The plug 68 is preferably of bronze or any other suitable material to minimize any possibility of wear of the steel shaft. Adjustment of the plug 68 to compensate for wear is readily effected by merely screwing the plug in further.

To accommodate different shafts, provision is made for vertically adjusting the cup 22. The cup is integrally cast with ears 76 that are provided with vertically elongated openings 78 whereby it may be secured in vertically adjusted position upon a frame 80 by means of bolts 82. Vertical adjustment may be effected by a screw 84 that is mounted in a lug 86 of the frame 80 and that is adapted to engage a lug 88 that is integral with one of the ears 76.

The desirability of maintaining the oil free from impurities has been referred to above, and a preferred construction for attaining this end has been described. The described construction would be useless with present-day oil cups, that are themselves not proof against the entrance of impurities. It is accordingly among the features of the present invention to provide an improved oil cup 90.

This oil cup 90 has not only the customary bottom wall 92 and side walls 94, but a top wall 96 as well. The top wall is provided with an opening 98 through which the oil may be admitted into the cup. A cover plate 100 for the opening 98 is adapted to contact with the top wall 96 on all sides of the opening to prevent the entry of impurities into the cup. The cover plate 100 is pivoted at 102 so as to swing in the horizontal plane of the top plate 96, and is provided with a latch 104 for holding the cover plate in closed position.

The oil cup 90 is connected to the cup 22 by a pipe 106 through which oil may pass from the oil cup 90 to the cup 22. The pipe is connected to a drilled oil hole 108 that is vertically provided in the cup 22 and that extends to an annular oil chamber 110 between the cup 22 and the bushing 20. This construction prevents siphoning out of the oil, tends to maintain the oil at the desired level, and permits the use of a comparatively large oil cup 90.

Many modifications will occur to persons skilled in the art, and all such are considered to fall within the spirit and scope of the invention as defined in the appended claims.

What is claimed is:

1. A device of the class described having, in combination, a tube, an expansible split element in the tube, a member within the split element, and means for actuating the member to expand the split element into close engagement with the interior walls of the tube.

2. A device of the class described having, in combination, an internally screw-threaded tube, an expansible, annular nut threaded in the tube, a split collar within the annular nut, and means for expanding the split collar to expand the nut into close engagement with the interior walls of the tube.

3. A device of the class described, having, in combination, an internally screw-threaded tube, a bushing in the tube having a tapered bore, an expansible annular nut threaded in the tube in contact with the bushing, an expansible collar within the annular nut, a tapered shaft extending into the tube through the expansible collar bearing against the walls of the tapered bore, and means for expanding the expansible collar to expand the nut into close engagement with the interior walls of the tube.

4. A device of the class described having, in combination, an internally screw-threaded tube, a bushing in the tube having a tapered bore, a split annular nut threaded in the tube in contact with the bushing, a split collar within the annular nut, a shaft extending into the tube through the split collar, a tapered sleeve fixed to the shaft bearing against the walls of the tapered bore, the split collar resting against the tapered sleeve, and means for expanding the split collar to expand the split nut into close engagement with the interior walls of the tube.

5. A device of the class described having, in combination, an internally screw-threaded, vertically disposed cup, a bushing in the cup having a tapered bore and vertically disposed oil ports, means for adjusting the vertical position of the bushing in the cup, a split annular nut threaded in the cup in contact with the bushing, the bottom wall of the nut being cut away so as not to close the oil ports, a split collar within the annular nut, a vertically disposed shaft extending into the cup through the collar with its end resting against the bottom wall of the cup, a tapered sleeve fixed to the shaft bearing against the walls of the tapered bore, whereby lubricant contained in the cup is adapted, during the rotation of the shaft, to travel upward between the tapered sleeve and the walls of the tapered bore, then over the top of the bushing and under the nut, and finally downward, through the oil ports, to the bottom of the cup, the split collar resting against the tapered sleeve, and means for expanding the split collar to expand the split nut into close engagement with the interior walls of the cup.

6. A device of the class described having, in combination, a frame, an internally screw-threaded cup adjustably mounted upon the frame in vertically disposed position, means for securing the cup in adjusted position upon the frame, a bushing in the cup having a tapered bore and vertically disposed oil ports, means for adjusting the vertical position of the bushing in the cup, a split annular nut threaded in the cup in contact with the bushing, the bottom wall of the nut being cut away so as not to close the oil ports, a split collar within the annular nut, a vertically disposed shaft extending into the cup through the collar, the bottom wall of the cup being provided with a thrust bearing against which the end of the shaft rests, a tapered sleeve fixed to the shaft bearing against the walls of the tapered bore, a lubricant-containing cup connected to the adjustably mounted cup, whereby a lubricant is adapted to pass from the lubricant-containing cup to the adjustably mounted cup, means for maintaining a lubricant film between the shaft and the thrust bearing during the rotation of the shaft, the split collar resting against the tapered sleeve, and means for expanding the split collar to expand the split nut into close angagement with the interior walls of the adjustable cup.

In testimony whereof, I have hereunto subscribed my name this 17th day of January, 1923.

WESLEY J. SHAW.